Patented Nov. 3, 1936

2,059,852

UNITED STATES PATENT OFFICE 2,059,852

AZO DYES AND METHOD FOR THEIR PREPARATION

Miles Augustinus Dahlen and Frithjof Zwilgmeyer, Wilmington, Del., assignors to E. I. du Pont de Nemours & Company, Wilmington, Del., a corporation of Delaware No Drawing. Application August 22, 1933, Serial No. 686,239

8 Claims. (Cl. 260—53)

This invention relates to new azo dyes, and more particularly refers to water-insoluble polyazo dyes having the following general formula:

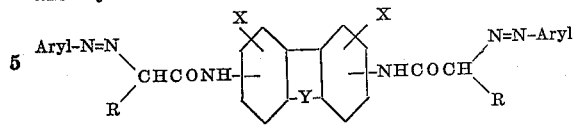

in which aryl represents the residue of an ice color base, X represents hydrogen or at least one non-water-solubilizing group, Y represents a bivalent radical, and R represents an acyl group.

It is an object of this invention to prepare new polyazo dyes and pigments. A further object is to prepare azo dyes which impart attractive colors to textile material. A still further object is to prepare dyes which color cotton and regenerated cellulose with shades having good fastness properties, these shades being usually in the range of yellow to orange. Additional objects will become apparent from a consideration of the following description.

These objects are attained according to the herein described invention which comprises coupling a diazotized ice color base with a diacyl-acetyl-amino derivative of a trinuclear organic ring compound having the following general formula:

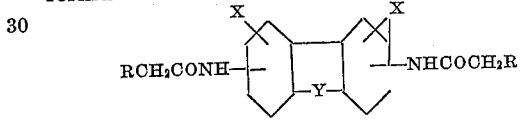

in which the symbols have the same meaning as heretofore.

The invention may be more fully understood by a consideration of the following illustrative examples, in which the quantities are stated in parts by weight:

Example 1

A printing paste was prepared according to the following formula:

4 parts of the diazoimino compound of the probable formula:

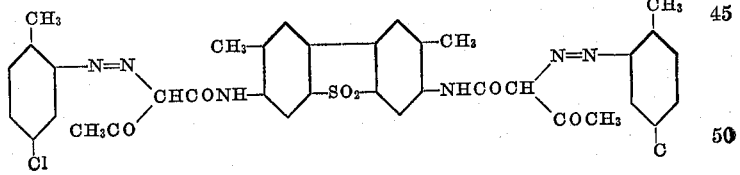

obtained by the action of diazotized 4-chloro-2-amino-toluene on methyl-glucamine 2 parts of 4,4'-diaceto-acetyl-amino-5,5'-dimethyl-diphenyl-2,2'-sulfone
26 parts water
3 parts sodium hydroxide solution of 30% strength
65 parts starch tragacanth thickener made up according to the following recipe:
    80 parts wheat starch
    360 parts gum tragacanth 6% solution
    560 parts water 100    1000

Cotton piece goods were printed from an engraved copper roll with the above paste, then dried. The goods were then immersed for 20 seconds in a bath of the following composition, previously heated to 220° F. and held at that temperature during the developing process:

1.0 part glacial acetic acid
0.5 part formic acid of 85% strength
28.0 parts sodium chloride
70.5 parts water 100.0

The developed printed goods were then rinsed, soaped at the boil, again rinsed, and dried. The printed pattern was developed as a bright greenish-yellow dyeing of good fastness properties, due to the formation of the insoluble azo color of the probable formula:

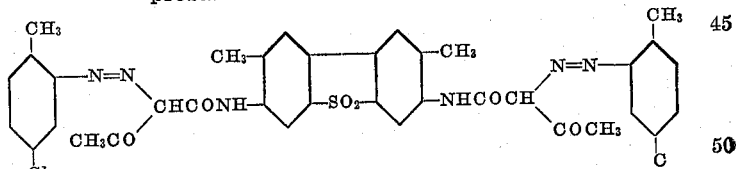

Example 2

Cotton piece goods were printed as in the previous example with a paste prepared according to the following formula:

3 parts of the diazoimino compound of the following formula:

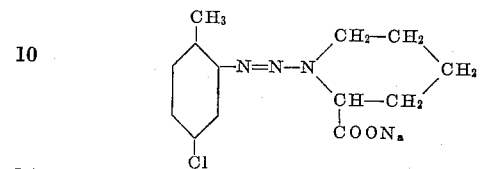

obtained by the action of diazotized 4-chloro-2-amino-toluene on piperidine-alpha-carboxylic acid 2 parts of 4,4'-diaceto-acetyl-amino-5,5'-dimethyl-diphenyl-2,2'-sulfone 27 parts water
3 parts sodium hydroxide solution of 30% strength
65 parts starch tragacanth thickener
——
100

The printed fiber was then subjected to the action of live steam containing the vapors of acetic acid, at a temperature of about 212° F. When color development was complete, the fabric was rinsed, soaped, rinsed, and dried as before. The printed pattern was developed to a bright greenish-yellow, due to the formation of the dye of the probable formula given in the preceding example.

Example 3

Cotton piece goods were printed with a paste prepared as follows:

5 parts of a dry mixture containing—

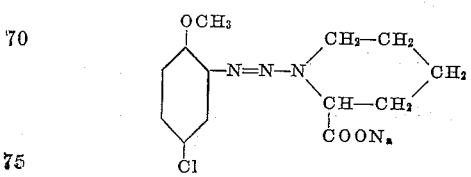

3 parts of the diazoimino compound of the probable formula:

obtained by the action of diazotized 4-chloro-2-amino-anisole on piperidine-alpha-carboxylic acid and 2 parts of 4,4'-diaceto-acetyl-amino-5,5'-dimethyl-diphenyl-2,2'-sulfone
27 parts water
3 parts sodium hydroxide solution of 30% strength
65 parts starch tragacanth thickener
——
100

The printed goods were subjected to the action of live steam containing the vapors of acetic acid. When color development was complete, the fabric was rinsed, soaped at the boil, rinsed and dried. The printed pattern was developed to a bright yellow of good fastness and high tinctorial value, due to the formation of the dye of the probable formula:

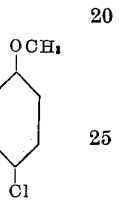

Example 4

The process of Example 2 was repeated exactly, except that in the printing paste, the 2 parts of 4,4'-diaceto-acetyl-amino-5,5'-dimethyl-diphenyl-2,2'-sulfone were replaced by 2 parts of 4,4'-diaceto-acetyl-amino-diphenyl-2,2'-sulfone.

The printed pattern was developed as a bright yellow dyeing of good fastness, due to the formation of the new dye of the probable formula:

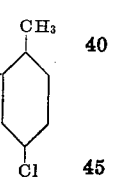

Example 5

The process of Example 2 was repeated exactly, except that in the printing paste, the 2 parts of 4,4'-diaceto-acetyl-amino-5,5'-dimethyl-diphenyl-2,2'-sulfone were replaced by 2 parts of 4,4'-diaceto-acetyl-amino-5,5'-dichloro-diphenyl-2,2'-sulfone.

The printed pattern was developed as a bright yellow dyeing of good fastness, due to the formation of the new dye of the probable formula:

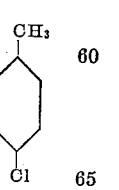

Example 6

The process of Example 2 was repeated exactly, except that in the printing paste, the 2 parts of 4,4'-diaceto-acetyl-amino-5,5'-dimethyl-diphenyl-2,2'-sulfone were replaced by 2 parts of 4,4'-diaceto-acetyl-amino-diphenyl-2,2'-oxide.

The printed pattern was developed as a bright yellow dyeing of good fastness, due to the formation of the new dye of the probable formula:

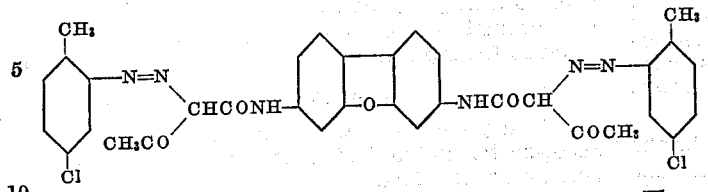

Example 7

The process of Example 2 was repeated exactly, except that in the printing paste, the 2 parts of 4,4'-diaceto-acetyl-amino-5,5'-dimethyl-diphenyl-2,2'-sulfone were replaced by 2 parts of 4,4'-diaceto-acetyl-amino - 5,5' - dimethyl - diphenyl-2,2'-azone.

The printed pattern was developed as a bright yellow dyeing of excellent fastness and high tinctorial value, due to the formation thereon of the new dye of the probable formula:

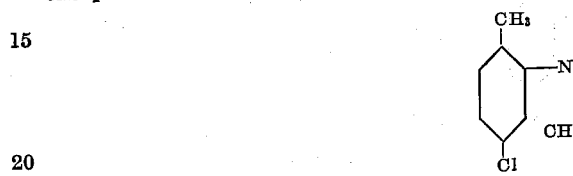

Example 8

The process of Example 2 was repeated exactly, except that in the printing paste, the 2 parts of 4,4'-diaceto-acetyl-amino-5,5'-dimethyl-diphenyl-2,2'-sulfone were replaced by 2 parts of 4,4'-diaceto-acetyl-amino-fluorene.

The printed pattern was developed as a bright yellow dyeing of good fastness, due to the formation of the new dye of the probable formula:

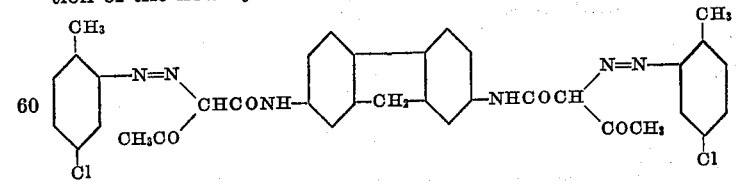

Example 9

The process of Example 2 was repeated exactly, except that in the printing paste, the 2 parts of 4,4'-diaceto-acetyl-amino-5,5'-dimethyl-diphenyl-2,2'-sulfone were replaced by 2 parts of 4,4'-diaceto-acetyl-amino-fluorenone.

The printed pattern was developed as a bright yellow dyeing of good fastness, due to the formation of the new dye of the probable formula:

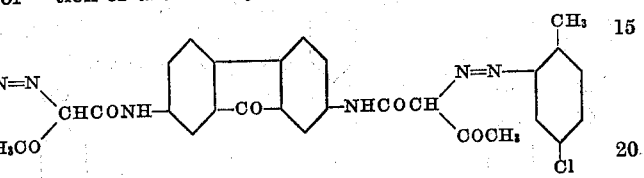

Example 10

The process of Example 2 was repeated exactly, except that in the printing paste, the 2 parts of 4,4'-diaceto-acetyl-amino-5,5'-dimethyl-diphenyl-2,2'-sulfone were replaced by 2 parts of 4,4'-diaceto-acetyl-amino-phenanthraquinone.

The printed pattern was developed as a bright yellow dyeing of good fastness, due to the formation of the new dye of the probable formula:

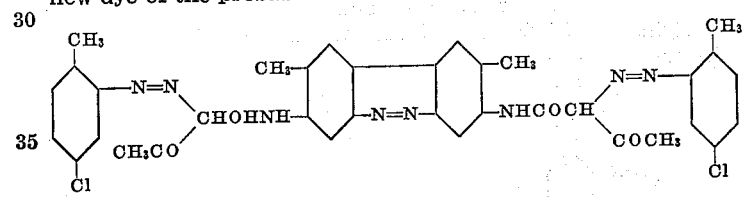

Example 11

The process of Example 2 was repeated exactly, except that in the printing paste, the 2 parts of 4,4'-diaceto-acetyl-amino-5,5'-dimethyl-diphenyl-2,2'-sulfone were replaced by 2 parts of 4,4'-difuroyl-acetyl-amino-5,5'-dimethyl-diphenyl-2,2'-sulfone.

The printed pattern was developed as a bright yellow dyeing of good fastness, due to the formation of the new dye of the probable formula:

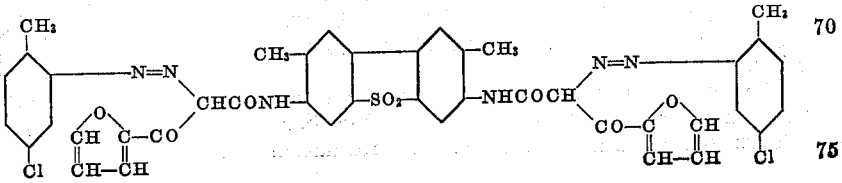

Example 12

The process of Example 2 was repeated exactly, except that in the printing paste, the 2 parts of 4,4'-diaceto-acetyl-amino-5,5'-dimethyl-diphenyl-2,2'-sulfone were replaced by 2 parts of 4,4'-dibenzoyl-acetyl-amino-5,5'-dimethyl-diphenyl-2,2'-sulfone.

The printed pattern was developed as a bright yellow dyeing, due to the formation of the new dye of the probable formula:

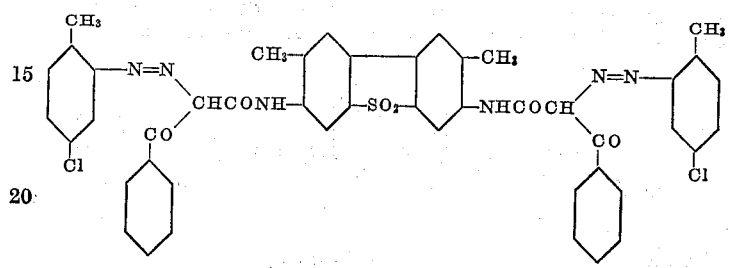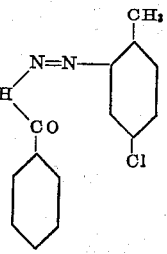

Example 13

The process of Example 2 was repeated exactly, except that in the printing paste, the 2 parts of 4,4'-diaceto-acetyl-amino-5,5'-dimethyl-diphenyl-2,2'-sulfone were replaced by 2 parts of 4,4'-di-(para-nitrobenzoyl-acetyl-amino)-5,5'-dimethyl-diphenyl-2,2'-sulfone.

The printed pattern was developed as a bright yellow dyeing, due to the formation of the new dye of the probable formula:

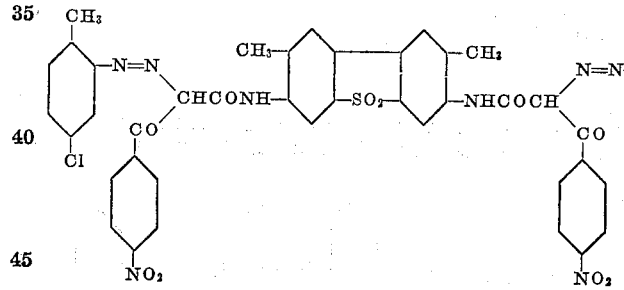

Example 14

Cotton piece goods were padded at 120° F. in a solution prepared as follows:

15 parts of 4,4'-diaceto-acetyl-amino-5,5'-dimethyl-diphenyl-2,2'-sulfone
40 parts Turkey red oil
60 parts sodium hydroxide solution of 32° Bé.
885 parts water
———
1000

10 parts of 4-chloro-2-amino-anisole were diazotized in the usual manner, and the mineral acidity neutralized by the addition of sodium acetate. The diazo solution was diluted to 1000 parts.

15 parts of the padded piece goods were run through a wringer, then immersed in the diazo solution described above. When color formation was complete, the goods were rinsed, soaped at the boil, again rinsed and dried. The goods were dyed to a bright yellow due to the formation of the insoluble azo color of the probable formula given in Example 3.

Example 15

Cotton piece goods were padded with 4,4'-diaceto-acetyl-amino-5,5'-dimethyl-diphenyl-2,2'-sulfone as described in Example 14. The goods were wrung out, then printed from an engraved roll with a printing paste prepared according to the following formula:

2 parts of a zinc-chloride-stabilized diazo salt prepared from 4-nitro-2-amino-anisole
13 parts of water
1 part of acetic acid
84 parts of starch tragacanth thickener
———
100

The printed goods were then rinsed, soaped at the boil, again rinsed and dried. The printed pattern was developed to a bright yellow, due to the formation of the new dye of the probable formula:

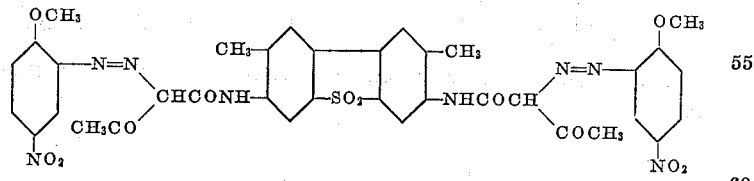

Example 16

Cotton piece goods were printed as described in Example 1, with a paste prepared according to the following formula:

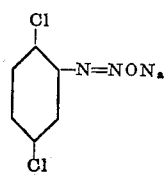

2.4 parts of the anti-diazotate ("nitrosamine") prepared from 2-5-dichloro-aniline, of the probable formula:

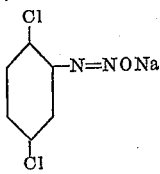

1.6 parts of 4,4'-diaceto-acetyl-amino-5,5'-dimethyl-diphenyl-2,2'-sulfone
28.0 parts of water
3.0 parts of caustic soda solution of 30% strength
65.0 parts of starch tragacanth thickener
——
100.0

The printed goods were subjected to the action of live steam containing the vapors of acetic acid. When color formation was complete, the fabric was rinsed and soaped at the boil, again rinsed and dried. The printed pattern was developed to a bright yellow of good fastness, due to the formation of the new dye of the probable formula:

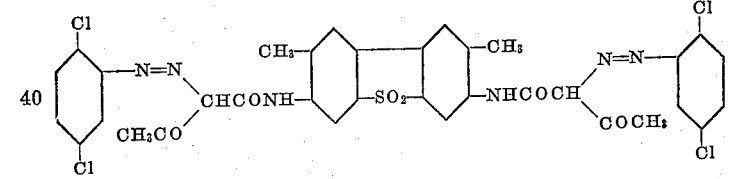

Example 17

As stated elsewhere in this application, the new colors resulting therefrom may also be produced in admixture with other ice colors, resulting in the production of intermediate shades, often of good fastness and desirable shade and brightness. The following example illustrates this type of color preparation:

Cotton piece goods were printed from an engraved roll with a printing paste prepared according to the following formula:
5.0 parts of a dry mixture containing the following components—
3.0 parts of the diazoimino compound of the probable formula:

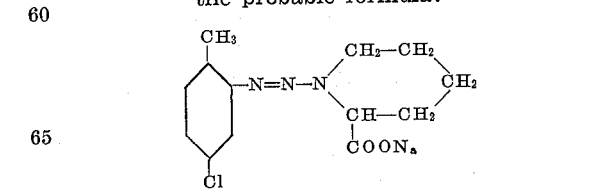

obtained by the action of diazotized 4-chloro-2-amino-toluene on piperidine-alpha-carboxylic acid
1.3 parts of the o-phenetidide of 2-3-hydroxy-naphthoic acid
0.7 part of 4,4'-diaceto-acetyl-amino-5,5'-dimethyl-diphenyl-2,2'-sulfone 27.0 parts of water
3.0 parts of sodium hydroxide solution 30% strength
65.0 parts of starch tragacanth thickener
——
100.0

The printed pattern was developed as in Example 2, resulting in the production of a bright orange dyeing, due to the formation thereon of a mixture of two dyes of the probable formula:

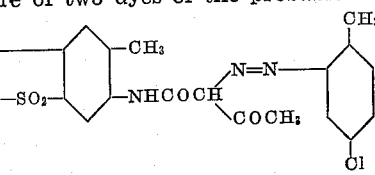

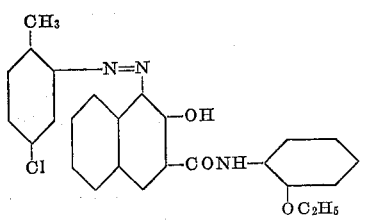

(A) is, of course, the new yellow color described in Example 1, (B) is a bright scarlet ice color of good fastness. When produced in admixture as described above, a brilliant orange of comparable fastness properties is obtained.

Example 18

2 parts of 4,4'-diaceto-acetyl-amino-5,5'-dimethyl-diphenyl-2,2'-sulfone were dissolved in 100 parts of water containing 3 parts of sodium hydroxide solution of 30% strength and 3 parts of the diazoimino compound prepared by the action of diazotized 4-chloro-2-amino-anisole on piperidine-alpha-carboxylic acid, of the probable formula given in Example 3. The solution was heated to 60° C., at which point 2 parts of glacial acetic acid were added, with vigorous stirring. After 2 minutes, the formation of the insoluble azo pigment color was complete. The product was removed by filtration, washed with 100 parts of water, and then dried at 60° C. The pigment was obtained as a bright yellow powder. The formula for the color is probably identical with that given in Example 3.

Example 19

Cotton piece goods were padded with 4,4'-diaceto-acetyl-amino-5,5'-dimethyl-diphenyl-2,2'-sulfone, as described in Example 14. The goods were wrung out, then printed from an engraved roll with a printing paste prepared according to the following formula:
2 parts of the diazoamino compound obtained by the action of diazotized 4-chloro-2-amino-anisole on piperidine-alpha-carboxylic acid, of the probable formula given in Example 3
14 parts water
84 parts starch tragacanth thickener
——
100

The printed goods were then developed as described in Example 3, and after color development was complete, they were soaped at the boil, rinsed and dried. The pattern was developed to a bright yellow, due to the formation of the new color of the probable formula given in the above-mentioned example.

It is, of course, understood that the above examples disclose only a relative few of the many compounds which may be used according to the present invention. While ice color bases of the benzene or naphthalene series, particularly the former, are preferred nevertheless numerous other well known ice color bases may be diazotized and coupled with the diacyl-acetyl-amino derivatives described herein. For example, the diazotization and coupling of a representative few of these bases with 4,4'-diaceto-acetyl-amino-5,5'-dimethyl-diphenyl-2,2'-sulfone, gives the following results:

| Diazo component | Shade of new color |
|---|---|
| Aniline | Yellow |
| o-Chloro-aniline | Do |
| m-Chloro-aniline | Do |
| p-Chloro-aniline | Do |
| p-Fluoro-aniline | Do |
| m-Nitraniline | Do |
| p-Nitraniline | Do |
| o-Toluidine | Do |
| m-Toluidine | Do |
| p-Toluidine | Do |
| 5-chloro-2-amino-toluene | Do |
| 4-fluoro-3-amino-toluene | Do |
| o-Anisidine | Do |
| 4-nitro-2-amino-anisole | Do |
| 4-amino-azobenzene | Orange |
| Dianisidine | Light brown |
| a-Amino-anthraquinone | Yellow |
| 4,4'-diamino-diphenylether | Light brown |
| a-Naphthylamine | Yellow |
| 4'-ethoxy-4-amino-diphenyl-amine | Brown |
| 3-amino-carbazole | Yellow |
| m-Amino-benzotrifluoride | Do |
| 2,5-dichloro-aniline | Do |
| 3,4-dichloro-aniline | Do |

As previously mentioned, this invention is not confined to ice color bases of the benzene or naphthalene series since amines such as those of the diphenyl, azobenzene, diphenylamine, diphenylether, anthraquinone and carbazole series may be used with satisfactory results. The aforementioned series are only intended to illustrate the numerous arylamines which are commonly referred to as ice color bases. Since these bases are well known it is to be understood that additional arylamines not included in the illustrative series but which are commonly considered to be ice color bases are intended to be used herein. These arylamines may have one or more non-water-solubilizing groups (called n-auxochromes) substituted thereon. In this specification and claims the term "n-auxochrome" denotes a member of the group alkyl, alkoxy, halogen, nitro, trifluoro-methyl and acylamino. The water-solubilizing groups (called s-auxochromes) which should not be present on the compounds selected are the carboxylic and sulfonic acid radicals.

The acyl radical, heretofore designated by R, may likewise be considerably modified without departing from the limits of this invention. Acyl radicals may be selected from the aliphatic, isocyclic or heterocyclic series. These acyl radicals may be further substituted by one or more n-auxochromes, the alkyl, alkoxy, nitro and halogen substituents giving particularly excellent results. For optimum results it may, in general, be stated that the acyl radical should be an aceto group. However, good results may be achieved by selecting the aroyl group, for example the benzoyl group, for this purpose. Illustrations of a few additional acyl radicals are propionyl, butyryl, decanoyl, benzoyl, 4-chloro-benzoyl, 4-nitro-benzoyl, alpha-naphthoyl, furoyl, and thenoyl. Copending application, Serial No. 685,638, filed August 17, 1933, describes coupling components of related character.

The bivalent bridge radical, referred to as Y, may be —CH$_2$—, —CO—, —CH=CH—, —CH$_2$CH$_2$—, —NH—, —N Alkyl—, —O—, —S—, —N=N—, —N=NO—, —SO$_3$—, and —COCO—. The aforementioned bridge radicals are intended to be representative of the well known substituents falling within this category.

The benzo nuclei of the trinuclear organic ring component may have n-auxochromes substituted thereon. Substituents such as alkyl, alkoxy, halogen and nitro radicals are well adapted hereto, although other commonly used non-water-solubilizing groups may be substituted therefor or in addition thereto. The amino groups which are substituted on this trinuclear ring component are preferably substituted in the 4,4' position, although they may instead be substituted in various other positions such as the 6,6', 5,5', or 4,6'. For optimum results the trinuclear residue should have the amino groups substituted in the 4,4' position. Nevertheless, as previously mentioned, satisfactory results have been obtained by using those components in which the amino groups occupy other positions than the 4,4' position.

These new dyes are especially well adapted for use in one-bath processes, wherein the diazo salt is first converted to a water-soluble diazoimino derivative, this diazoimino compound then being mixed with the desired coupling components and the usual assistants. The textile fibers after being treated therewith are developed by subjecting them to the action of weak acids at elevated temperatures. The compounds may also be utilized according to various other common methods. For instance, the fibers may be padded with the coupling component and then immersed in the diazo solution, or the padded fibers may be printed with pastes containing the diazo salts. If insoluble pigments are desired coupling may take place in solution or suspension.

Where diazoimino compounds are produced for use in one-bath processes the following stabilizing agents may be coupled with the desired diazo salt:

| | |
|---|---|
| Diethanolamine | NH(CH$_2$CH$_2$OH)$_2$ |
| Sarcosine | CH$_3$NHCH$_2$COOH |
| Ethyl-taurine | C$_2$H$_5$NHCH$_2$CH$_2$SO$_3$H |
| Proline | CH$_2$—CH$_2$ <br> \| \| <br> CH$_2$  CH—COOH <br> \\ / <br> NH |

4-sulfo-2-amino-benzoic acid

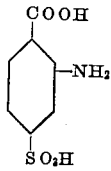

In those processes wherein the textile material is padded with the coupling component and then printed with pastes containing diazo salts, such salts may be stabilized with agents such as zinc chloride, cadmium chloride, naphthalene-1-5-disulfonic acid, etc.

The new dyes and pigments described herein have attractive and desirable shades. They are well adapted for use in one-bath processes, and when used in such manner impart desirable colors of good fastness properties to the treated materials. These products are readily prepared, and due to the great number of compounds which may be utilized therefor, are a welcome addition to the azo color art.

As many apparent widely different embodiments of this invention may be made without departing from the spirit and scope thereof, it is to be understood that the invention is not limited to the specific embodiments thereof except as defined in the appended claims.

We claim:

1. A process for making water-insoluble azo dyes which comprises coupling a diazotized ice color base with a diacyl-acetyl-amino derivative of a trinuclear organic ring compound represented by the formula:

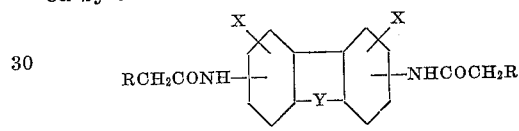

in which R represents an acyl group, X represents one of a group consisting of hydrogen and an n-auxochrome, and Y represents a bivalent bridge radical.

2. A process for making water-insoluble azo dyes which comprises coupling a diazotized ice color base selected from the group consisting of amines from the benzene, diphenyl, naphthalene, azobenzene, diphenylamine, diphenylether, anthraquinone and carbazole series, and of a member of the said series having an n-auxochrome substituent, with a diacyl-acetyl-amino derivative of a trinuclear organic ring compound represented by the formula:

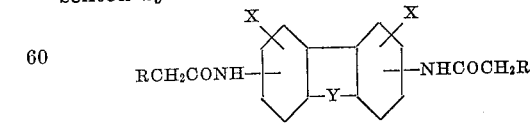

in which R represents an acyl group, X represents one of the groups consisting of hydrogen and an n-auxochrome, and Y represents a bivalent bridge radical.

3. A process for making water-insoluble azo dyes which comprises coupling a diazotized ice color base of the benzene series having attached to a nuclear carbon atom one of a group consisting of hydrogen and an n-auxochrome, with a diacyl-acetyl-amino derivative of a trinuclear organic ring compound represented by the formula:

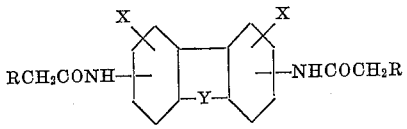

in which R represents an acyl group, X represents one of a group consisting of hydrogen and an n-auxochrome, and Y represents a bivalent bridge radical.

4. A process for making water-insoluble azo dyes which comprises coupling a diazotized ice color base of the benzene series having attached to a nuclear carbon atom one of the group consisting of hydrogen and an n-auxochrome, with a diacyl-acetyl-amino derivative of a trinuclear organic ring compound represented by the formula:

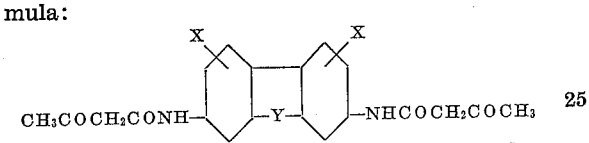

in which X is one of a group consisting of hydrogen and an n-auxochrome, and Y is a bivalent bridge radical.

5. Water-insoluble azo dyes having the following general formula:

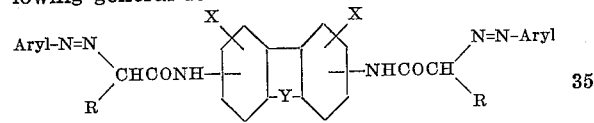

in which X is an n-auxochrome, Y represents a bivalent bridge radical, and R represents an acyl group.

6. Water-insoluble azo dyes having the following general formula:

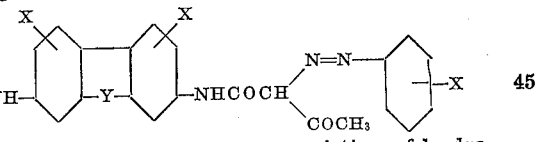

in which X is one of a group consisting of hydrogen and an n-auxochrome, and Y represents a bivalent bridge radical.

7. Water-insoluble azo dyes represented by the formula:

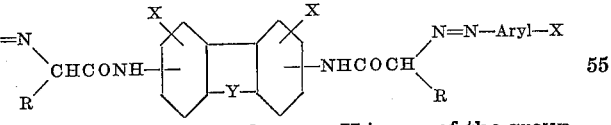

in which R is an acyl group, X is one of the group of compounds consisting of hydrogen and an n-auxochrome, and Y is a bivalent bridge radical.

8. Water-insoluble azo dyes represented by the formula:

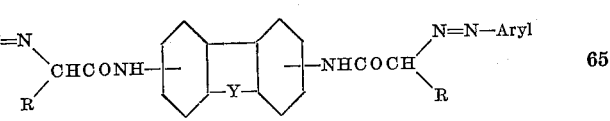

in which R is an acyl group, in which aryl has at least one n-auxochrome substituent, in which the rings of the trinucleus have at least one n-auxochrome substituent, and in which Y represents a bivalent bridge radical.

MILES AUGUSTINUS DAHLEN.
FRITHJOF ZWILGMEYER.